United States Patent [19]

Sekine

[11] Patent Number: 5,655,875
[45] Date of Patent: Aug. 12, 1997

[54] PLASTIC TORQUE CONVERTER STATOR WITH INSERT-MOLDED ONE-WAY CLUTCH OUTER RACE

[75] Inventor: Katsumi Sekine, Nihonmatsu, Japan

[73] Assignee: NOK Corporation, Tokyo, Japan

[21] Appl. No.: 582,910

[22] Filed: Jan. 4, 1996

[30] Foreign Application Priority Data

Jan. 20, 1995 [JP] Japan ................................. 7-024517
Mar. 1, 1995 [JP] Japan ................................. 7-065247

[51] Int. Cl.⁶ ........................... F16D 13/74; F16D 33/20
[52] U.S. Cl. ............................ 415/123; 415/191; 415/200; 415/208.2; 415/915; 60/339; 60/345; 192/113.32; 264/108; 264/328.12
[58] Field of Search ................ 415/123, 200, 415/191, 192, 208.2, 208.3, 211.1, 211.2, 186, 188, 915; 60/339, 341, 345; 192/3.34, 41 R, 45, 113.32; 264/108, 328.12; 416/180, 197 C

[56] References Cited

U.S. PATENT DOCUMENTS

| | | | |
|---|---|---|---|
| 4,534,456 | 8/1985 | Slezak | 60/339 |
| 5,094,076 | 3/1992 | Henricks | 60/345 |
| 5,431,536 | 7/1995 | By et al. | 415/200 |

FOREIGN PATENT DOCUMENTS

| | | |
|---|---|---|
| 63-18050 | 4/1988 | Japan . |
| 3-20754 | 2/1991 | Japan . |
| 4-22210 | 2/1992 | Japan . |
| 4-27247 | 3/1992 | Japan . |

*Primary Examiner*—Christopher Verdier
*Attorney, Agent, or Firm*—Jacobson, Price, Holman & Stern, PLLC

[57] ABSTRACT

A torque converter stator made by injection molding of plastic material includes a metallic one-way clutch outer race which is insert molded within the stator hub. A plurality of recesses forming lubricant passages extend through the wall of a radial flange of the hub. The lubrication recess (30) is defined by a part-cylindrical outer wall (32) and a pair of planar side walls (34) spaced apart by a distance $d$. The juncture of the outer wall (32) and the side wall (34) is filleted to form a rounded corner (36) having a radius of curvature R1. To relieve the weld line (60) from concentration of residual stress due to post-molding shrinkage while avoiding stress concentration at the rounded corners (36), the ratio R1/d is selected to be 0.18–0.35.

2 Claims, 8 Drawing Sheets

PLASTIC TORQUE CONVERTER STATOR WITH INSERT-MOLDED ONE-WAY CLUTCH OUTER RACE

BACKGROUND OF THE INVENTION

1. Field of the Invention

The present invention relates to a stator of a torque converter for use in an automotive transmission system. More particularly, the present invention is concerned with a torque converter stator made by molding of a fiber reinforced plastic material and wherein a metallic outer race of a one-way clutch is insert molded.

2. Description of the Prior Art

In an automotive torque converter, a stator having curved vanes is installed between an impeller and a turbine. The stator vanes are made integral with a stator hub which is rotatably supported by a one-way clutch around a turbine shaft for freewheeling in one direction.

The stator hub includes a radial flange for axially positioning an outer race of the one-way clutch. A plurality of axially extending recesses are formed across the radial flange along the inner periphery thereof to form lubricant passages for supplying lubricant to the moving parts of the one-way clutch.

To reduce weight and cost, attempts have been made to build the torque converter stators by injection molding of a fiber reinforced plastic material. However, it has been found that torque converter stators are difficult to manufacture solely with the fiber reinforced plastic material because of high precision required for various dimensional parameters. Accordingly, as disclosed, for example, in Japanese Patent Kokoku Publication No. 63-18050 and Japanese Utility Model Kokai Publication Nos. 3-20754, 4-22210 and 4-27247, there has been proposed in the art to insert mold a metallic outer race of the one-way clutch within the plastic stator hub. However, the problem which must be overcome in injection molding of the torque converter stator incorporating the one-way clutch outer race insert is that cracks are generated in the plastic molding forming the radial flange of the stator hub due to the residual stress resulting from the post-molding shrinkage of the plastic material.

More specifically, during injection molding, the flow of plastic material under pressure coming from an extruder is forced to flow through an axial sprue formed in the molds. The flow is then spread radially outwardly as it flows through a disc gate connecting the sprue with a mold cavity. A plurality of cores which are complementary in shape to the axial lubricant passages are formed in the molds to define the lubricant passages in the molded product. As the plastic material flowing out of the disc gate is infected into the mold cavity, the flow of plastic material is bifurcated around each core and the bifurcated flows thereafter meet and join with each other along a radial plane known in the art as the "weld line".

The presence of the weld line undesirably reduces the tensile strength of the plastic molding as measured in a direction perpendicular to the weld line, because the reinforcing fibers blended in the plastic material tend to be oriented more or less parallel to the weld line. When the plastic molding undergoes the post-molding shrinkage, the residual stress concentrated at the weld line leads to the formation of cracks.

It is therefore the object of the present invention to provide a one-way clutch outer race inserted, plastic torque converter stator which is specifically designed to avoid the formation of cracks along the weld line.

SUMMARY OF THE INVENTION

According to the invention, a torque converter stator includes a vaned hub made by molding of a fiber reinforced plastic material. The stator hub includes a tubular boss and an annular flange extending radially inwardly from an end of the boss and a metallic one-way clutch outer race is insert molded within the inner bore of the boss. The flange is provided with a plurality of recesses extending axially therethrough to form lubricant passages.

The features of the invention are that each of the recesses is defined by an outer wall generally coaxial with the hub and a pair of opposite planar side walls spaced apart with each other by a predetermined distance (d) and that the juncture of the outer wall and each of the side walls is configured to form a rounded corner having a predetermined radius of curvature (R1), each of the recesses being configured such that the ratio (R1/d) of the radius of curvature (R1) of the rounded corner with respect to the distance (d) is 0.18–0.35.

With decreasing radius of curvature (R1) of the rounded corners, the residual stress due to material shrinkage is diverted away from the weld line and is concentrated at the rounded corners situated on both sides of the weld line. This advantageously relieves the weld line from stress concentration so that formation of cracks along the weld line is avoided. However, the corners will be broken if subjected to excessive stress concentration. By selecting the ratio (R1/d) of the radius of curvature (R1) of the rounded corner with respect to the distance (d) to be 0.18–0.35, the tensile strength both at the weld line and the corners is optimized to effectively prevent formation of cracks.

In a preferred embodiment of the invention, the stator is so sized and dimensioned that the ratio (L2/L1) of the radius (L2) of the outer walls of the recesses with respect to the radius (L1) of the outer periphery of the clutch outer race is 0.7–1.0.

These features and advantages of the invention, as well as other features and advantages thereof, will become apparent from the following description.

DESCRIPTION OF THE PREFERRED EMBODIMENT

Figure 1:
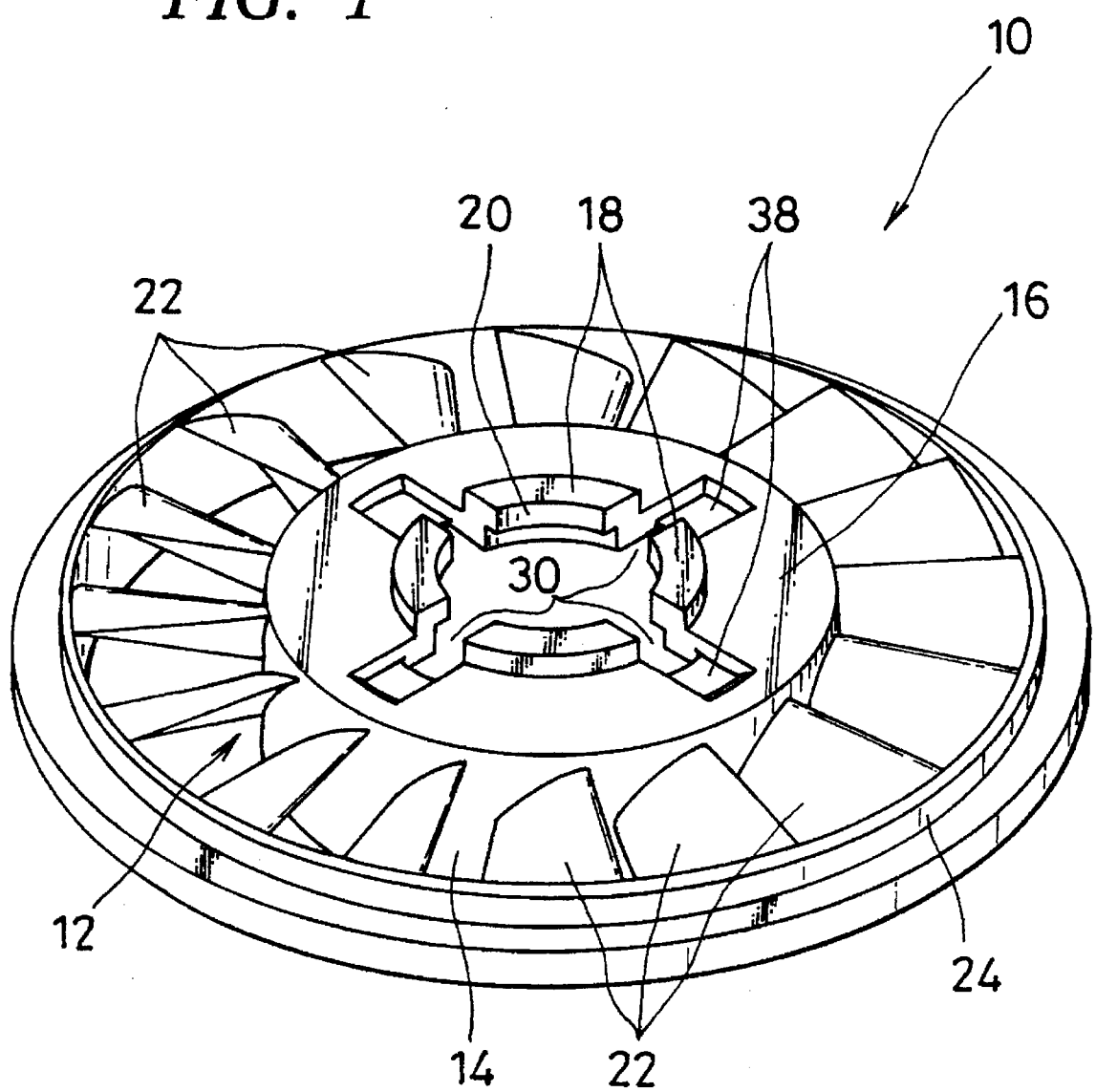
FIG. 1 is a perspective view of the torque converter stator according to the invention.
Figure 2:
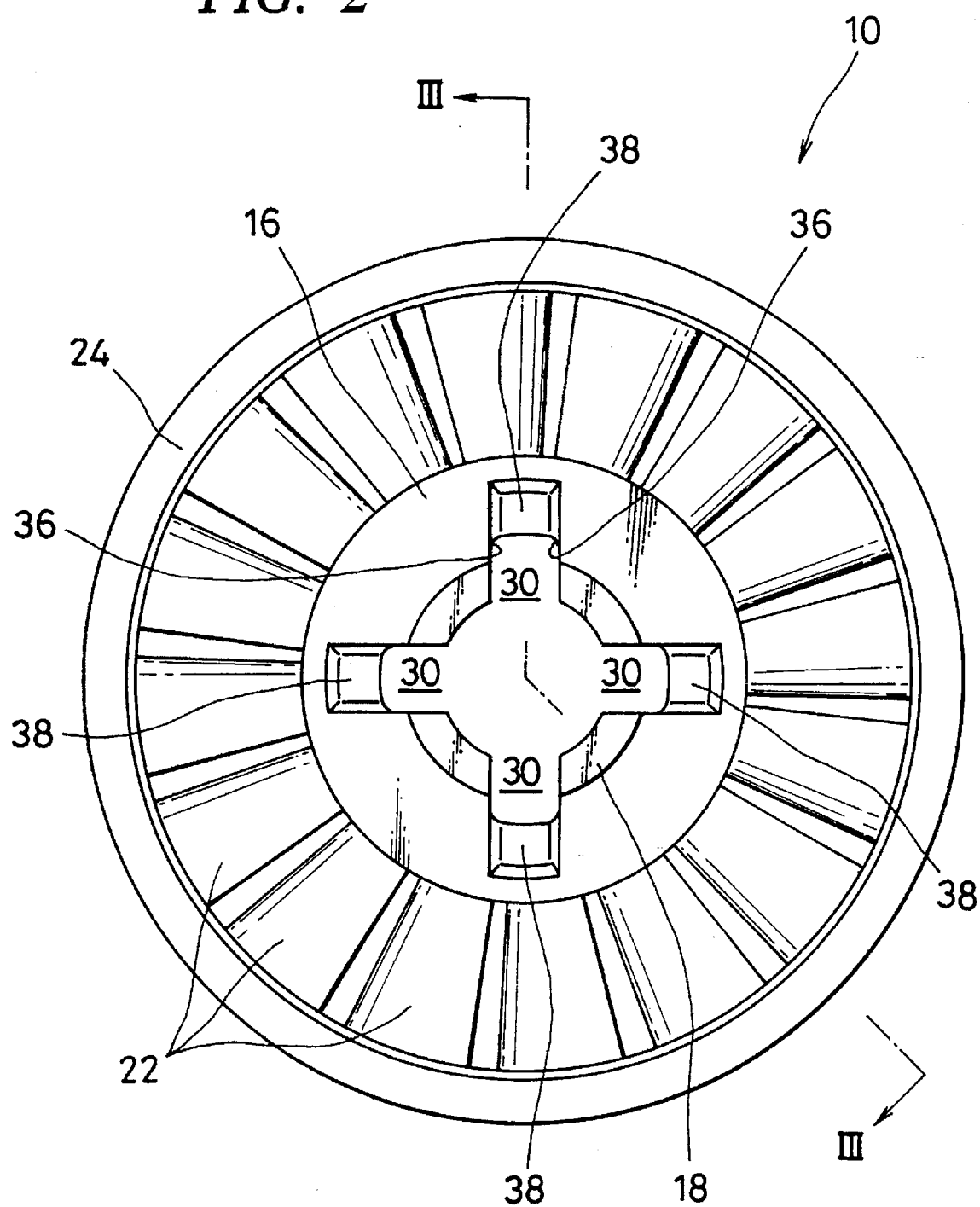
FIG. 2 is a top plan view of the stator shown in FIG. 1.
Figure 3:
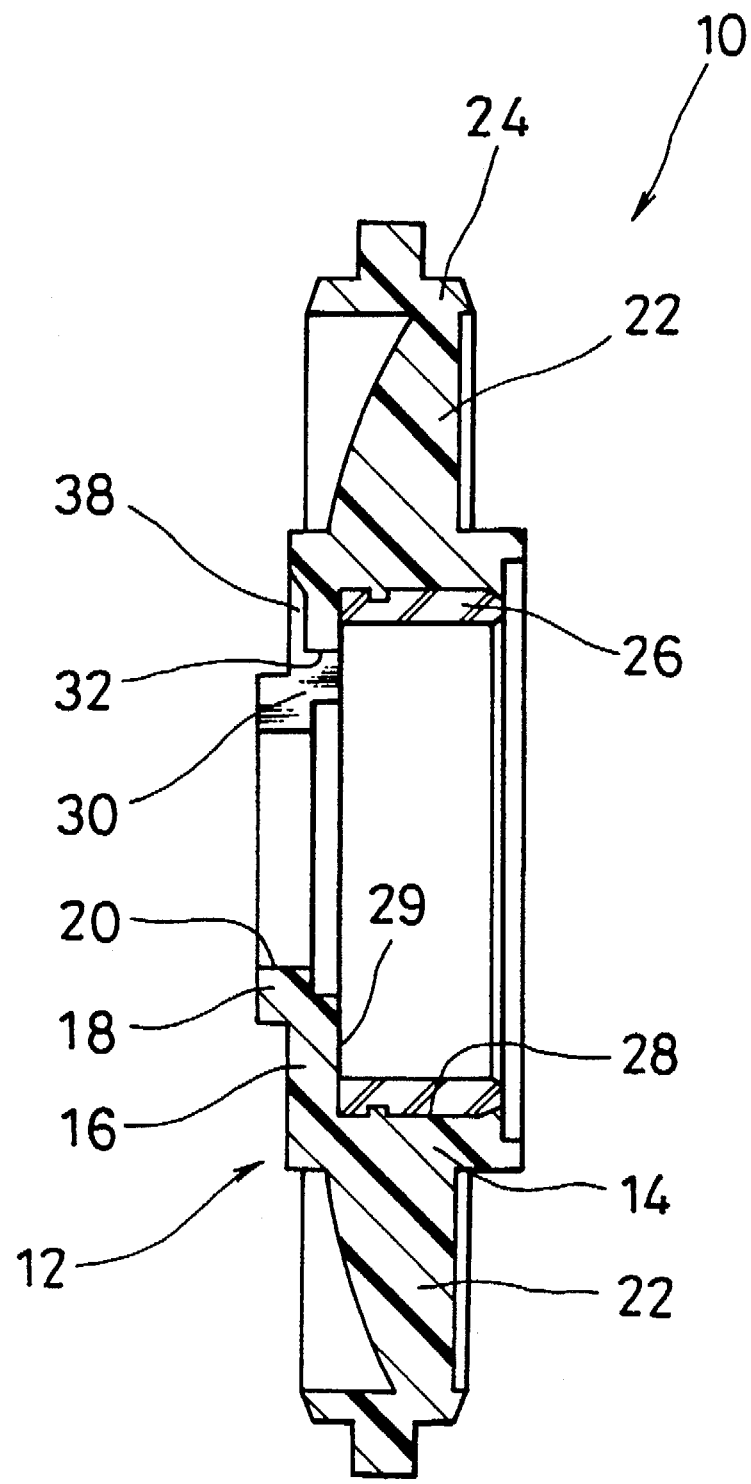
FIG. 3 is a cross-sectional view taken along the line II—II of FIG. 2.

Referring to FIGS. 1–3, the torque converter stator, designated generally by the reference numeral 10, has a central hub 12 comprised of a tubular boss 14 and an annular flange 16 extending radially inwardly from an end of the boss 14.

In the illustrated exemplary embodiment, the radial flange 16 has a staggered central portion 18, the inner periphery 20 of which is defined by a cylindrical plane coaxial with the axis of the stator.

A plurality of curved vanes 22 are molded integrally with the boss 14 and extend radially outwardly therefrom. The vanes 22 are connected with each other at the outer periphery thereof by an outer rim 24. The hub 12, vanes 22 and outer rim 24 are made by molding of a fiber reinforced thermosetting plastic material such as a phenolic resin. These parts may equally be made from a thermoplastic resin such as a copolymer of polyphenylenesulfide.

A metal insert 26 serving as an outer race of a one-way clutch is insert molded within the inner bore 28 of the boss 14. The one-way clutch outer race insert 26 is axially positioned by the inner wall 29 of the radial flange 16.

The radial flange 16 is provided with a plurality of recesses 30 having a U-shaped cross-section and serving as the lubricant passages to the one-way clutch. These recesses 30 extend radially outwardly from the inner periphery 20 of the flange 16 and extend axially throughout the wall of the flange 16. The recesses 30 are spaced apart angularly equally from one another. In the illustrated embodiment, four such recesses are formed.

Figure 5:
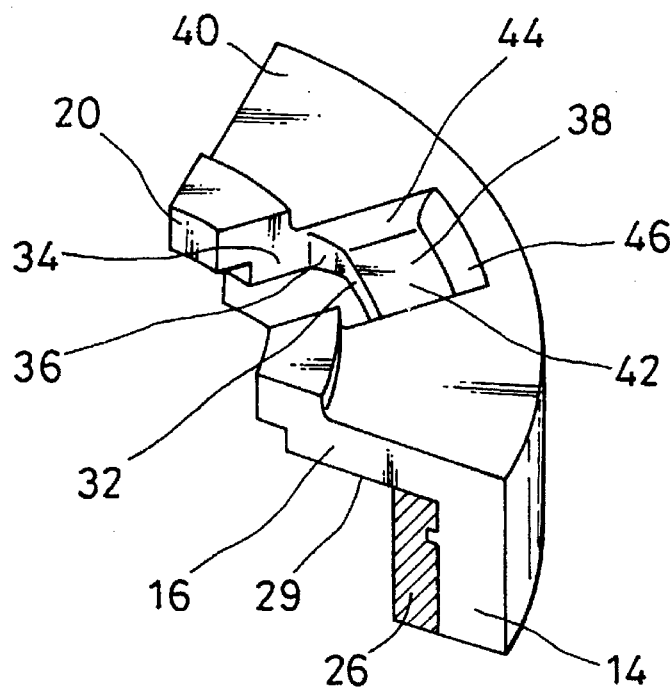
FIG. 5 is a perspective view of a quartered model of the stator hub shown in FIGS. 1–3.
Figure 6:
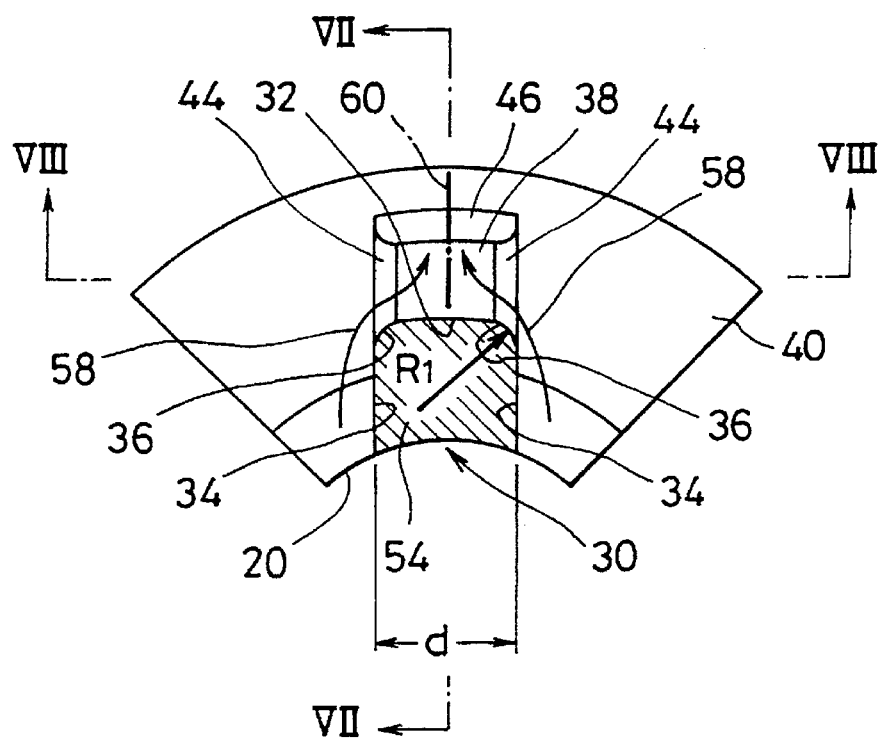
FIG. 6 is a top plan view of the quartered model shown in FIG. 5.

As best shown in FIGS. 5 and 6, each recess or lubricant passage 30 is defined by an outer wall 32 and a pair of opposite planar side walls 34 spaced apart with each other by a distance $d$.

The recess outer wall 32 is made generally coaxial with the hub 12 so as to present a part-cylindrical inner boundary. The juncture of the outer wall 32 and each of the side walls 34 is configured to form a rounded corner 36 having a radius of curvature R1 (FIG. 6) which is much smaller than the radius of curvature of the outer wall 32.

In response to the decrease in the radius of curvature R1 of the rounded corners 36, the stress concentration factor at the corners will be increased so that the corners 36 will be subjected to intensive stress concentration. This is advantageous in relieving the weld line, described later with reference to FIGS. 4 and 6, from stress concentration. On the other hand, however, if the radius of curvature R1 were overly reduced, then the corners 36 would be fractured due to excessive stress concentration.

According to the invention, each of the recesses 30 is configured such that the ratio of the radius of curvature R1 of the rounded corner 36 with respect to the distance $d$ between the side walls 34 (i.e., the circumferential width of the recess) is R1/d=0.18–0.35. With this arrangement, the residual stress due to post-molding shrinkage is evenly distributed over the inner periphery of the recesses 30 so that the tensile strength both at the weld line and the corners 36 is optimized.

Figure 7:
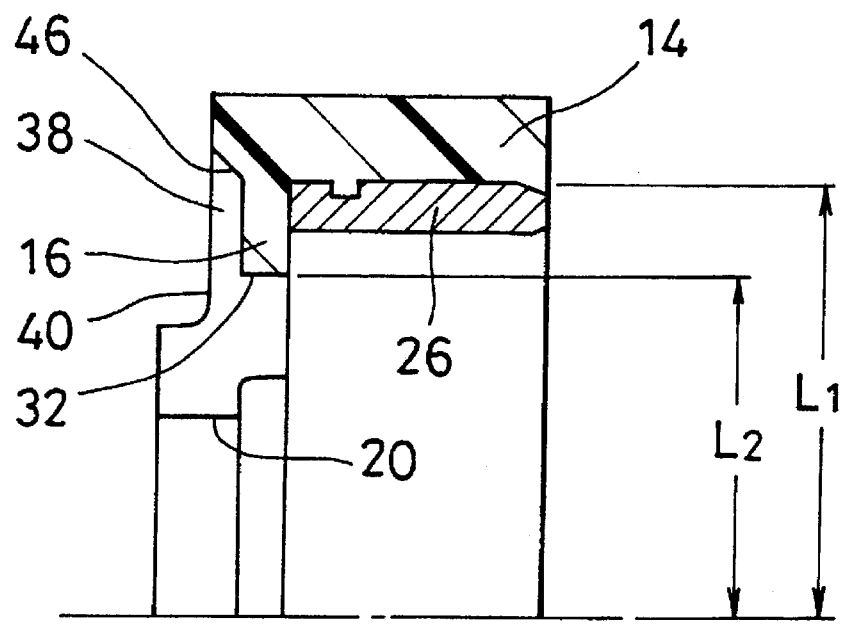
FIGS. 7 and 8 are cross-sectional views taken along the lines VII—VII and VIII—VIII of FIG. 6, respectively; and, FIGS. 9–11 are graphs showing the results of the finite element method (FEM) analysis.

As shown in FIG. 7, the one-way clutch outer race insert 26 has an outer radius L1 whereas the recess outer wall 32 has a radius L2. According to the preferred embodiment of the invention, the ratio of the recess outer wall radius L2 with respect to the outer radius L1 of the outer race insert 26 is selected to be L2/L1=0.7–1.0.

Figure 8:
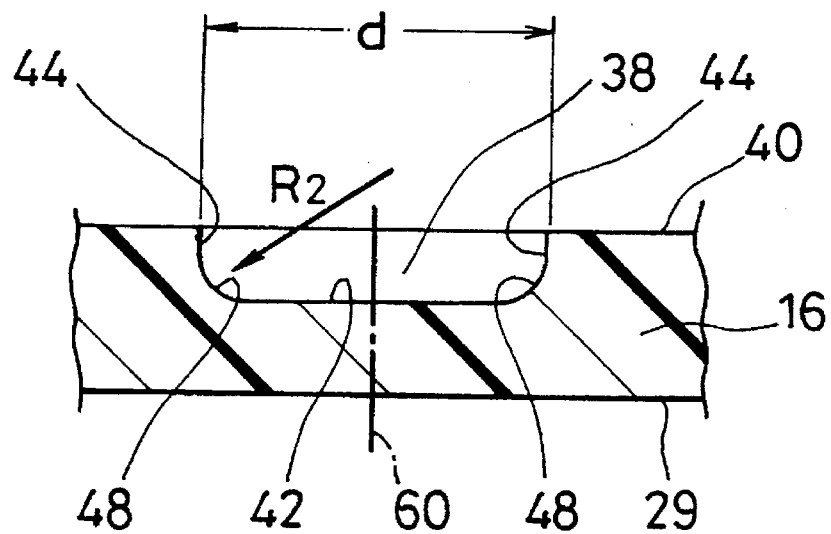

As shown in FIGS. 1, 2, 5 and 6, each of the lubrication recesses 30 is radially aligned with and in communication with a radially extending lubricant groove 38 formed on the end face 40 of the radial flange 16. As best shown in FIGS. 5 and 8, each groove 38 is defined by a bottom wall 42, a pair of opposite side walls 44 and an inclined outer wall 46. The juncture of the bottom wall 42 and each of the side walls 44 of the groove 38 is filleted or rounded to form a rounded corner 48 of a radius of curvature R2 to avoid stress concentration. The radius of curvature R2 of the groove rounded corner 48 is selected such that the ratio R2/R1 of the radius of curvature R2 with respect to the radius of curvature R1 of the recess rounded corner 36 is less than 1.0.

The outer race-inserted stator 10 may be molded by a conventional injection molding machine, not shown, having fixed and movable molds defining a cavity which is complementary in shape to the outer contour of the stator 10.

Figure 4:
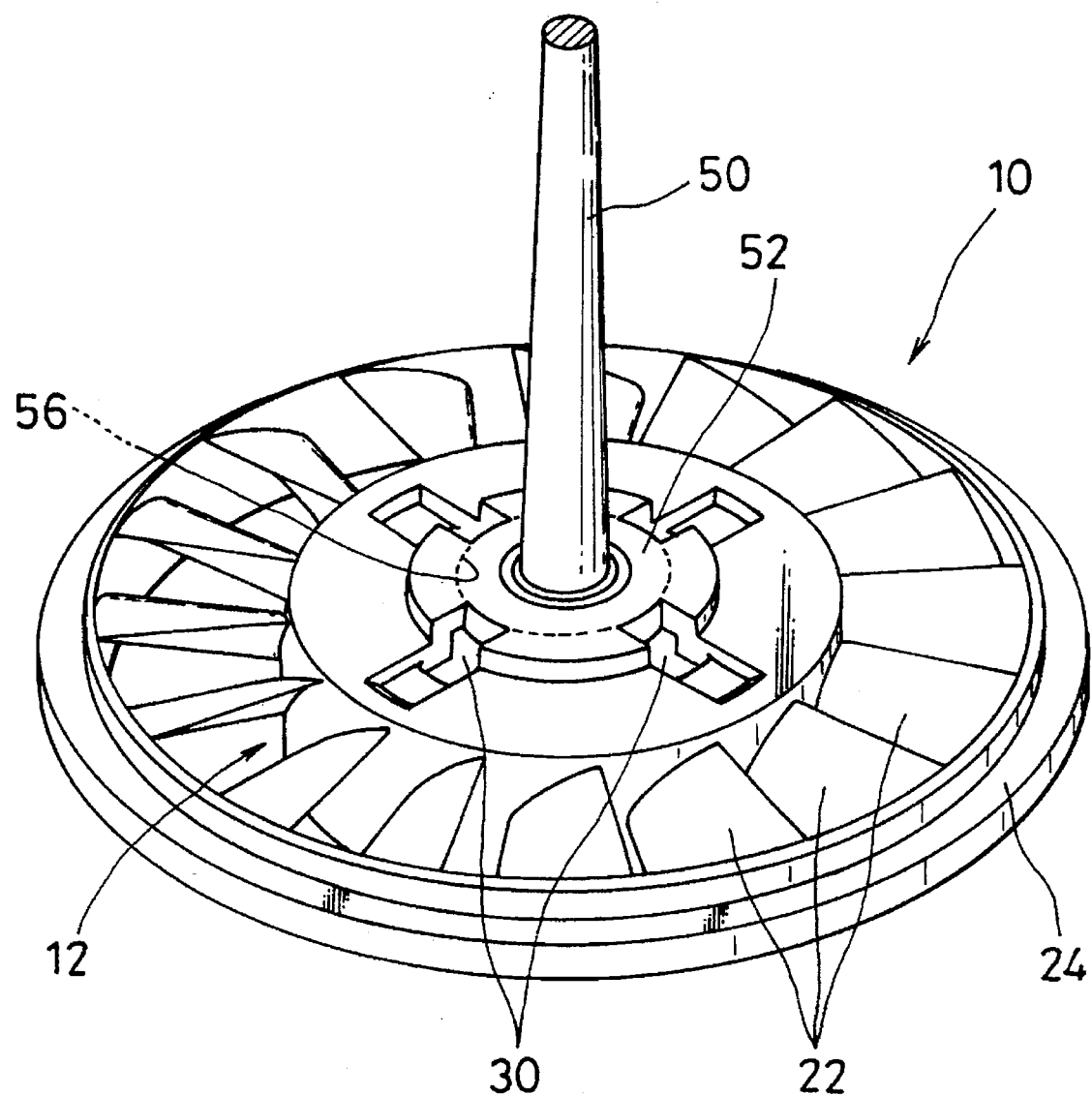
FIG. 4 is a perspective view showing the semi-product of the stator immediately subsequent to the injection molding process.

Referring to FIG. 4, there is shown a semi-product of the stator immediately subsequent to the injection molding process. The semi-product includes an elongated tapered portion 50 corresponding to a sprue formed in the fixed mold and a disc-shaped portion 52 corresponding to a disc gate defined between the fixed and movable molds. Four lubrication recesses 30 have been formed in the semi-product by the provision of corresponding cores formed in the mold, the cross-section of one of such cores being indicated in FIG. 6 by the hatched area 54. After molding, the sprue portion 50 and the disc gate portion 52 are cut off along a cylindrical plane 56, shown by the dotted line in FIG. 4, which corresponds to the inner periphery 20 of the final product.

During injection molding, the flow of plastic material flowing out of the radial disc gate into the mold cavity is divided by and spread apart around the cores 54 as shown by the arrows 58 in FIG. 6. The bifurcated flows 58 are then joined along a central plane 60 which is commonly referred-to in the art as the weld line. The presence of the weld line 60 undermines the tensile strength of the molded mass as measured in a direction perpendicular to the weld line, because the reinforcing fibers in the plastic material are somewhat oriented parallel to the weld line and since the bonding of the bifurcated flows is not always perfect.

During cooling and/or curing process of the molded product, the plastic mass undergoes a substantial post-molding shrinkage, in contrast to the metal insert 26 which experiences much less shrinkage because the coefficient of linear expansion of a metal is much smaller. As the metal insert 26 operates to withstand the radial and circumferential shrinkage of the plastic mass, the plastic portion of the stator hub 12 located radially inwardly of the metal insert 26 is subjected to a negative or tensile residual stress.

If the residual stress resulting from the post-molding shrinkage were concentrated at the weld line 60, the portion of the radial flange 16 situated behind the bottom wall 42 of the lubrication grooves 38 would readily be fractured along the weld line 60.

In an attempt to determine the optimum shape and dimensional parameters for the stator hub which are believed to be essential in avoiding the stress concentration upon the weld line 60 yet avoiding fracture of the corner portions 36, the present inventor has analyzed by the finite element method (FEM) the residual stress estimated to be exerted on the stator hub while varying various dimensional parameters. To this end, a quartered model of the stator hub as shown in FIG. 5 was subjected to the FEM. The model was divided into a finite number of elements and the residual stress was calculated for each element by using a conventional thermal stress analyzing program to derive the residual stress at the weld line 60 and the rounded corners 36 of the stator hub.

First, in the quartered model analyzed, the residual stress at the weld line 60 and the rounded corners 36 was calculated while varying the radius of curvature R1 of the rounded corners 36 and the distance $d$ between the side walls to see the effect that the variation in the ratio R1/d might have upon the safety factor at the weld line 60 and the rounded corners 36. For the purpose of this analysis, it was presumed that R2/d=0 and L2/L1=0.78. The results of the FEM analysis are plotted in the graph of FIG. 9.

Figure 9:
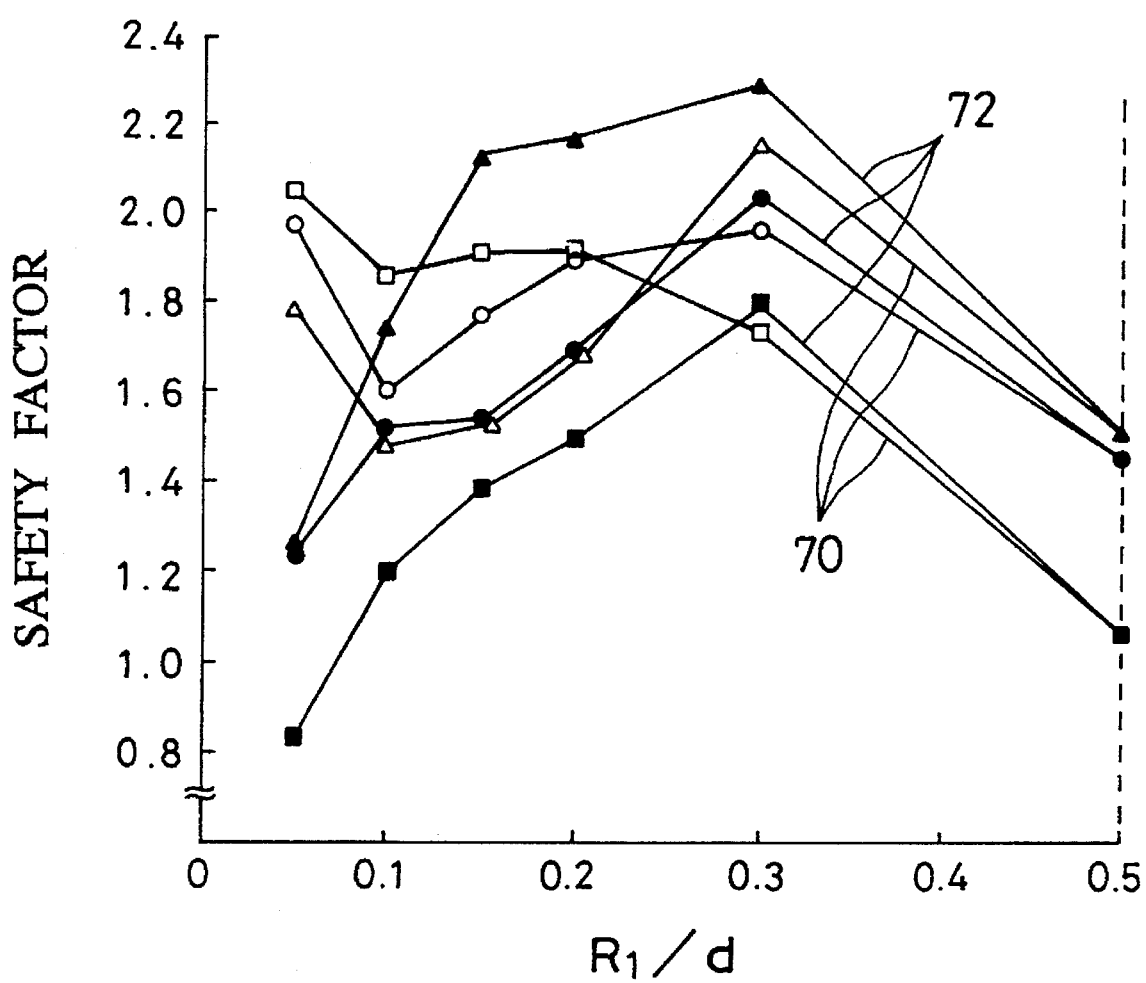

In the graph of FIG. 9, the abscissa represents the variation in the ratio R1/d. The ordinate indicates the safety factor which is expressed in terms of the tensile strength of the plastic material as divided by the residual stress. The tensile strength for the weld line 60 is determined on the assumption that fracture of material takes place when the material undergoes 0.4% of elongation as measured perpendicular to the plane of the weld line, whereas the tensile strength for the corners 36 is determined on the assumption that fracture takes place at 0.8% elongation.

In the graph of FIG. 9, the curves 70 indicate the safety factor for the weld line 60 and curves 72 indicate the safety factor for the corners 36. The curves linked by the blank rectangular dots and the black rectangular dots represent, respectively, the safety factor when d=7 mm, with the curves linked by the blank circular dots and the black circular dots indicating the safety factor when d=10 mm, and with the curves linked by the blank triangular dots and the black triangular dots indicating the safety factor when d=15 mm.

As will be apparent from the curves 70 shown in the graph of FIG. 9, the safety factor for the weld line 60 increases with decreasing ratio R1/d. With R1/d=0.5, the point of stress concentration is brought into registration with the weld line 60 so that the weld line undergoes fracture with the minimum residual stress. As the radius of curvature R1 of the rounded corners 36 is decreased so that the ratio R1/d is decreased, the point of stress concentration is shifted away from the weld line toward the rounded corners 36 so that the weld line is relieved from stress concentration. Accordingly, as long as the safety factor for the weld line 60 is concerned, it is desirable that the radius of curvature R1 of the rounded corners 36 be as small as possible.

As shown by the curves 72, however, the safety factor for the corners 36 will be sacrificed if the radius of curvature R1 of the rounded corners 36 and, hence, the ratio R1/d is excessively decreased. This is because the corners 36 are fractured due to stress concentration.

From the graph of FIG. 9, the present inventor believes that with the ratio R1/d=0.18–0.35, the mechanical strength both at the weld line 60 and the rounded corners 36 is optimized.

Then, the effect of the variation in the ratio L2/L1 was investigated in a similar manner by the FEM analysis. For the purpose of the analysis, it was presumed that R1/d=0.27 and R2/d=0. The results of the FEM analysis are plotted in the graph of FIG. 10 wherein the ordinate similarly indicates the safety factor. The curve 80 indicates the safety factor for the weld line 60 and curve 82 indicates the safety factor for the corners 36.

Figure 10:
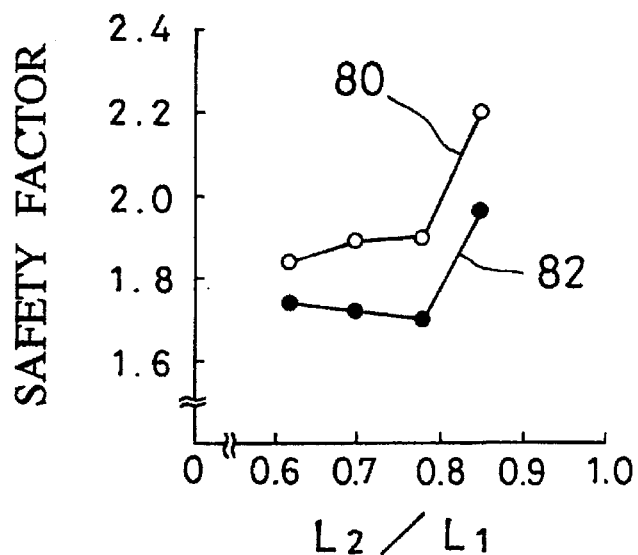

It will be observed from the graph of FIG. 10 that the safety factor at the weld line 60 as well as at the corners is increased as the ratio L2/L1 approaches 1.0. This is because the recess outer wall 32 is relieved from the residual stress as it approaches the outer periphery of the clutch outer race. Taking the wall thickness of the outer race, it is considered that the optimum result is obtainable with the ratio L2/L1= 0.7–1.0.

The effect of the variation in the ratio R2/R1 was also investigated by the FEM analysis. For the purpose of the analysis, it was presumed that R1/d=0.27 and L2/L1=0.78. The results of the analysis are plotted in the graph of FIG. 11 wherein the ordinate similarly indicates the safety factor. The curve 84 indicates the safety factor for the weld line 60 and the curve 86 indicates the safety factor for the corners 36.

Figure 11:
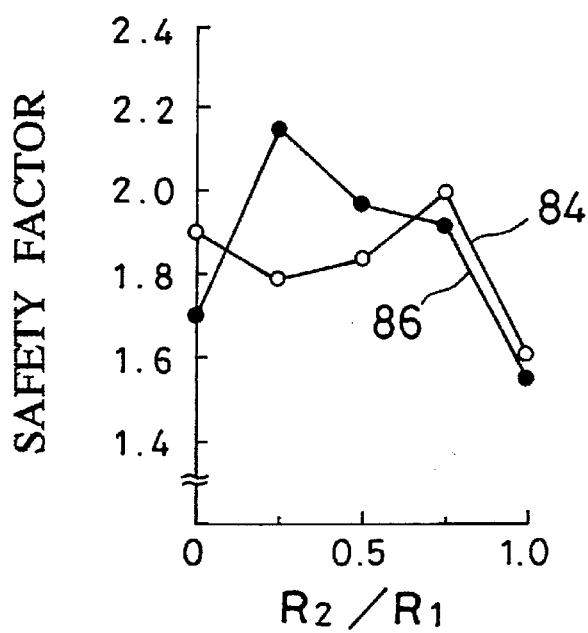

It will be noted from the graph of FIG. 11 that with the ratio R2/R1 of less than 1.0, the point of stress concentration acting on the weld line 60 is offset from the point of stress concentration on the corners 36 so that the balance between the safety factor at the weld line 60 and the safety factor at the corners 36 is optimized.

EXAMPLE

The present inventor has fabricated the outer race-inserted torque converter stators by injection molding of glass fiber reinforced phenolic resin. The dimensional parameters of the stator were as follows.

| Speicmen | R1/d | L2/L1 | R2/R1 |
|---|---|---|---|
| A | 0.14 | 0.61 | 1 |
|   | (0.09–0.18) | (0.60–0.62) |   |
| B | 0.09 | 0.65 | — |
|   | (0.07–0.11) | (0.65–0.66) |   |
| C | 0.20 | 0.64 | — |
|   | (0.18–0.21) | (0.59–0.69) |   |
| D | 0.20 | 0.78 | 0.75 |
|   | (0.18–0.21) | (0.77–0.78) | (0.60–0.92) |
| E | 0.28 | 0.76 | — |
|   | (0.25–0.30) | (0.75–0.78) |   |

In the table given above, the figure in the parenthesis indicates the tolerance. Specimens B, C and E are not provided with the lubrication groove 38.

Specimens were tested by a thermal shock test wherein they were subjected to 100 cycles of heating at a temperature of 165° C. for 2 hours followed by cooling at −40° C. for 2 hours.

In Specimen A, a crack was formed at the rounded corner after 20 cycles of thermal shock. In Specimen B, cracks were generated at the rounded corner and the weld line after 80 cycles of thermal shock. In Specimen C, a crack was formed at the rounded corner after 86 cycles of thermal shock.

In Specimens D and E, no formation of crack was observed after 100 cycles of thermal shock.

While the present invention has been described herein with reference to the specific embodiment thereof, it is contemplated that the present invention is not limited thereby and various changes and modifications may be made therein for those skilled in the art without departing from the scope of the invention.

What is claimed is:

1. A torque converter stator comprising:

a hub having a tubular boss and an annular flange extending radially inwardly from an end of said boss;

a plurality of vanes integral with and extending radially outwardly from said boss;

said hub and said vanes being made by molding of a fiber reinforced plastic material;

a metallic one-way clutch outer race insert-molded within the inner bore of said boss;

said annular flange having a plurality of recesses extending axially therethrough to permit a lubricant to flow to said one-way clutch, said recesses being angularly equally spaced apart with each other and extending radially outwardly from the inner periphery of said annular flange;

each of said recesses being defined by an outer wall generally coaxial with said hub and a pair of opposite planar side walls spaced apart with each other by a predetermined distance (d);

the juncture of said outer wall and each of said side walls being configured to form a rounded corner having a predetermined radius of curvature (R1);

each of said recesses being configured such that the ratio (R1/d) of said radius of curvature (R1) of said rounded corner with respect to said distance (d) is 0.18–0.35, and further including:

a plurality of radially extending lubricant grooves formed on the end face of said annular flange and being in communication respectively with said recesses, each of said grooves having a bottom wall and a pair of opposite side walls, the juncture of said bottom wall and each of said side walls of said groove being filleted to form a rounded corner having a predetermined radius of curvature (R2), the ratio (R2/R1) of said radius of curvature (R2) of said rounded corner of said grooves with respect to the radius of curvature (R1) of said rounded corner of said recesses is less than 1.0.

2. A torque converter stator as defined in claim 1, wherein the ratio (L2/L1) of the radius (L2) of said outer walls of said recesses with respect to the radius (L1) of the outer periphery of said clutch outer race is 0.7–1.0.

* * * * *